United States Patent
Sun et al.

(10) Patent No.: US 10,854,897 B2
(45) Date of Patent: Dec. 1, 2020

(54) TEMPERATURE CONTROL SYSTEM AND METHOD FOR FUEL CELL SYSTEM AND FUEL CELL SYSTEM

(71) Applicant: CUMMINS ENTERPRISE LLC, Indianapolis, IN (US)

(72) Inventors: Fengcheng Sun, Shanghai (CN); Honggang Wang, Niskayuna, NY (US); Nan Xu, Shenyang (CN)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 198 days.

(21) Appl. No.: 16/203,907

(22) Filed: Nov. 29, 2018

(65) Prior Publication Data

US 2019/0207230 A1    Jul. 4, 2019

(30) Foreign Application Priority Data

Jan. 3, 2018 (CN) .......................... 2018 1 0005597

(51) Int. Cl.
*H01M 8/0432* (2016.01)
*H01M 8/04664* (2016.01)
(Continued)

(52) U.S. Cl.
CPC ..... *H01M 8/0432* (2013.01); *H01M 8/04343* (2013.01); *H01M 8/04395* (2013.01);
(Continued)

(58) Field of Classification Search
CPC ........... H01M 8/0432; H01M 8/04671; H01M 8/04343; H01M 8/04395; H01M 8/04679; H01M 8/04701; H01M 8/04753
See application file for complete search history.

(56) References Cited

U.S. PATENT DOCUMENTS 6,186,254 B1   2/2001  Mufford et al.
6,645,652 B2  11/2003  Cownden et al.
(Continued)

FOREIGN PATENT DOCUMENTS

JP    4765349 B2    9/2011
JP    5470234 B2    4/2014
(Continued)

OTHER PUBLICATIONS

Linoya et al., "Inverse Response in Process Control", Industrial & Engineering Chemistry, vol. No. 54, Issue No. 07, pp. 39-43, 1962.
(Continued)

*Primary Examiner* — Chun Cao
(74) *Attorney, Agent, or Firm* — Barnes & Thornburg LLP

(57) ABSTRACT

Temperature control system and method for a fuel cell system are disclosed. The temperature control system includes a state detector, a control selector, a normal controller and an internal model controller. The state detector determines whether the fuel cell system is in a leakage condition based on a dynamic transfer function from an air flowrate provided to the fuel cell system to a fuel cell temperature. The control selector selects to switch between the normal controller and the internal model controller based on a determined result. The normal controller is configured for controlling an air flowrate of the fuel cell system which is not in the leakage condition. The internal model controller is configured for controlling the air flowrate of the fuel cell system in the leakage condition to control the fuel cell temperature. A fuel cell system with the temperature control system is also disclosed.

22 Claims, 8 Drawing Sheets

(51) Int. Cl.
*H01M 8/04701* (2016.01)
*H01M 8/04746* (2016.01)
*H01M 8/0438* (2016.01)

(52) U.S. Cl.
CPC ... *H01M 8/04671* (2013.01); *H01M 8/04679* (2013.01); *H01M 8/04701* (2013.01); *H01M 8/04753* (2013.01)

(56) References Cited

U.S. PATENT DOCUMENTS

| | | | |
|---|---|---|---|
| 6,651,761 B1 | 11/2003 | Hrovat et al. | |
| 7,261,962 B1* | 8/2007 | Czajkowski | H01M 8/04955 429/423 |
| 8,262,756 B2 | 9/2012 | Ukai | H01M 8/04776 48/197 R |
| 8,349,505 B2 | 1/2013 | Mizukami et al. | |
| 8,691,454 B1* | 4/2014 | Czajkowski | H02J 3/381 429/428 |
| 8,808,937 B2 | 8/2014 | Takemoto et al. | |
| 8,815,461 B2 | 8/2014 | Takeuchi et al. | |
| 9,083,014 B2* | 7/2015 | Tamura | H01M 8/04007 |
| 10,541,437 B2* | 1/2020 | Kojima | H01M 8/12 |
| 2002/0182465 A1* | 12/2002 | Okamoto | H01M 8/0612 429/425 |
| 2004/0028970 A1 | 2/2004 | Sakai et al. | |
| 2007/0154750 A1* | 7/2007 | Ukai | H01M 8/04776 429/412 |
| 2012/0178007 A1 | 7/2012 | Cai et al. | |
| 2012/0270124 A1 | 10/2012 | Masui et al. | |
| 2013/0302708 A1 | 11/2013 | Kamijo | |
| 2014/0120439 A1* | 5/2014 | Makino | H01M 8/04559 429/429 |
| 2016/0049708 A1 | 2/2016 | Kuwabara | |
| 2017/0237095 A1 | 8/2017 | Yokoyama et al. | |
| 2018/0145351 A1* | 5/2018 | Wang | H01M 8/04843 |
| 2018/0198141 A1* | 7/2018 | Gagliardo | H01M 8/04574 |

FOREIGN PATENT DOCUMENTS

| | | |
|---|---|---|
| WO | 2007058283 A1 | 5/2007 |
| WO | 2010025478 A2 | 3/2010 |

OTHER PUBLICATIONS

Waller et al., "On Inverse Repsonse in Process Control", Industrial & Engineering Chemistry Fundamentals, vol. No. 14, Issue No. 03, pp. 221-223, 1975.

Babatunde et al., "Process Dynamics, Modeling, and Control", Oxford University Press, pp. 613-615, 1994.

Liso et al., "Thermal Modeling and Temperature Control of a PEM Fuel Cell System for Forklift Applications", International Journal of Hydrogen Energy, vol. No. 39, Issue No. 16, pp. 8410-8420, May 27, 2014.

Guilbert et al., "Fault-tolerant control for PEMFC and its DC/DC converter", 5th International Youth Conference, Conference on Pisa, Italy, pp. 1-6, 2015.

* cited by examiner

TEMPERATURE CONTROL SYSTEM AND METHOD FOR FUEL CELL SYSTEM AND FUEL CELL SYSTEM

BACKGROUND

This disclosure relates generally to the field of fuel cells, and more particularly to a temperature control system and method for a fuel cell system and a fuel cell system having the temperature control system.

Fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems are being widely developed as an energy supply system because fuel cells are environmentally superior and highly efficient. As single fuel cell can only generate voltages of about 1V, therefore, a plurality of fuel cells are usually stacked together (usually referred to as a fuel cell stack) to get a desired voltage.

Extending the fuel cell stack's life and durability is a crucial for its commercialization. Fuel cell temperature would affect thermal efficiency, durability and life of the fuel cell stack. Too high fuel cell temperature would lead to material failure, thermal runaway or even total plant shutdown. However, if the fuel cell temperature is too low, sealing material of the fuel cell stack does not seal efficiently at the low temperature which will cause gas leakage. Thus, the fuel cell temperature should be controlled in a precise target range.

While temperature control of the fuel cell is critical, it is also the most one of difficult challenges in an overall fuel cell control system partially because of the long thermal response time (1.5 hours) due to large fuel cell stack and the resultant increased mass.

When leakage such as cross-leakage occurs in the fuel cell, oxygen gas in the air, instead of oxygen ions received from a cathode of the fuel cell via diffusion through an electrolyte, would enter an anode of the fuel cell. Under this circumstance, the fuel would perform a direct combustion reaction at the anode with the oxygen gas and the combustion reaction would generate a lot of heat, which would cause sudden change of the fuel cell temperature.

Therefore, how to control the fuel cell temperature in the condition of leakage of the fuel cell would become increasingly urgent.

BRIEF DESCRIPTION

In one aspect of embodiments of the present disclosure, a temperature control system for a fuel cell system is provided. The temperature control system comprises a state detector, a control selector, a normal controller and an internal model controller. The state detector is configured for determining whether the fuel cell system is in a leakage condition based on a dynamic transfer function from an air flowrate provided to the fuel cell system to a fuel cell temperature of the fuel cell system. The control selector is configured for selecting to switch between a normal controller and an internal model controller based on a determined result. The normal controller is configured for controlling an air flowrate of the fuel cell system which is not in the leakage condition to control the fuel cell temperature. The internal model controller is configured for controlling the air flowrate of the fuel cell system in the leakage condition to control the fuel cell temperature.

In another aspect of embodiments of the present disclosure, a temperature control method for a fuel cell system is provided. The temperature control method comprises determining whether the fuel cell system is in a leakage condition based on a dynamic transfer function from an air flowrate provided to the fuel cell system to a fuel cell temperature of the fuel cell system; selecting to switch between a normal controller and an internal model controller based on a determined result; controlling, by the internal model controller, an air flowrate of the fuel cell system to control the fuel cell temperature when the fuel cell system is in the leakage condition; and controlling, by the normal controller, the air flowrate of the fuel cell system to control the fuel cell temperature when the fuel cell system is not in the leakage condition.

In still another aspect of embodiments of the present disclosure, a fuel cell system is provided. The fuel cell system comprises a fuel cell stack for generating power and having an anode and a cathode, a fuel regulator for regulating a fuel flowrate of a fuel provided to the anode, an air blower for regulating an air flowrate of air provided to the cathode, an air flowmeter for measuring the air flowrate, a temperature sensor for measuring a fuel cell temperature, and the temperature control system above-mentioned.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including", "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. In addition, Terms indicating specific locations, such as "top", "bottom", "left", and "right", are descriptions with reference to specific accompanying drawings. Embodiments disclosed in the present disclosure may be placed in a manner different from that shown in the figures. Therefore, the location terms used herein should not be limited to locations described in specific embodiments.

Fuel Cell System with Temperature Control System

Figure 1:
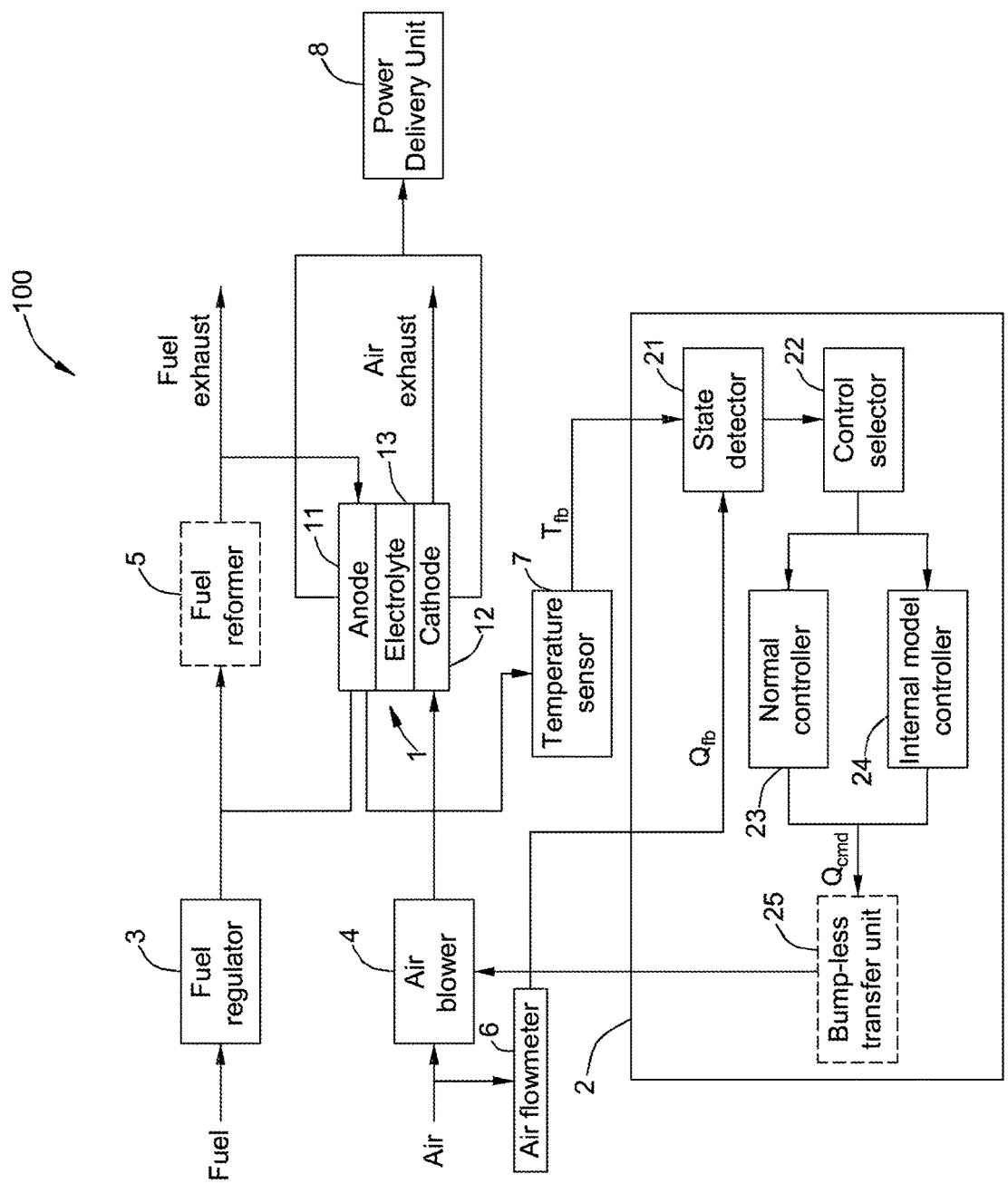
FIG. 1 is a schematic diagram of a fuel cell system with a temperature control system in accordance with one embodiment of the present disclosure.

FIG. 1 illustrates a schematic block diagram of an exemplary fuel cell system 100 in accordance with one embodiment of the present disclosure. As shown in FIG. 1, the exemplary fuel cell system 100 includes a fuel cell stack 1 for generating power. The generated power may be provided to a load via a power delivery unit 8. The fuel cell stack 1 may include a plurality of fuel cells which are stacked together. The fuel cell stack 1 includes an anode 11, a cathode 12, and an electrolyte 13 disposed between the anode 11 and the cathode 12. The anode 11 of the fuel cell stack 1 has an anode inlet and an anode outlet.

When the fuel cell system 100 is in operation, a fuel is provided to the anode 11 of the fuel cell stack 1 and air, such as oxygen in the air is provided to the cathode 12 of the fuel cell stack 1. The fuel cell system 100 may include a fuel regulator 3 for regulating a fuel flowrate of the fuel provided to the anode 11 and an air blower 4 for regulating an air flowrate of the air provided to the cathode 12. The anode 11 may support electrochemical reactions that generate electricity. The fuel may be oxidized at the anode 11 with oxygen ions received from the cathode 12 via diffusion through the electrolyte 13, so heat, steam and electricity may be created.

Optionally, the fuel cell system 100 may further include a fuel reformer 5. The fuel reformer 5 may receive the fuel and a tail gas from the anode outlet and generate a reformate. At least one portion of the reformate may be returned to the anode inlet and the remainder may be discharged as a fuel exhaust. The oxygen in the air is supplied to the cathode 12 as an oxidant and the remainder may be discharged as an air exhaust from the cathode 12.

With continued reference to FIG. 1, in order to control a fuel cell temperature of the fuel cell system 100, the fuel cell system 100 of the present disclosure includes a temperature control system 2. The fuel cell temperature mentioned in the present disclosure may include a temperature at the anode outlet of the fuel cell stack 1, a temperature of a fuel cell surface, a temperature of a bottom or top plate of the fuel cell stack 1, and a temperature in an anode gas passage of the fuel cell stack 1. Hereinafter, the temperature at the anode outlet will be shown as an example of the fuel cell temperature in the figures. The air blower 4 may be communicatively connected with the temperature control system 2 and the temperature control system 2 may control the air blower 4 to control and regulate the air flowrate provided to the cathode 12 of the fuel cell stack 1 so as to control and adjust the fuel cell temperature of the fuel cell system 100.

The temperature control system 2 includes a state detector 21, a control selector 22, a normal controller 23 and an internal model controller 24. The state detector 21 may determine whether the fuel cell system 100 is in a leakage condition based on a dynamic transfer function from the air flowrate provided to the fuel cell system 100 to the fuel cell temperature of the fuel cell system 100. The control selector 22 may select to switch between the normal controller 23 and the internal model controller 24 based on a determined result. The normal controller 23 is configured to control the air flowrate of the fuel cell system 100 which is not in the leakage condition, i.e. in a normal condition, to control the fuel cell temperature. The internal model controller 24 is configured to control the air flowrate of the fuel cell system 100 in the leakage condition to control the fuel cell temperature.

The fuel cell system 100 includes an air flowmeter 6 and a temperature sensor 7. The air flowmeter 6 and the temperature sensor 7 may be communicatively connected with the state detector 21 of the temperature control system 2. The air flowmeter 6 may measure the air flowrate provided to the cathode 12 of the fuel cell stack 1, and provide a measured air flowrate feedback $Q_{fb}$ to the state detector 21. The temperature sensor 7 may measure the fuel cell temperature and provide a measured fuel cell temperature feedback $T_{fb}$ to the state detector 21. The state detector 21 may generate the dynamic transfer function based on the air flowrate feedback $Q_{fb}$ and the fuel cell temperature feedback $T_{fb}$.

In one embodiment, the dynamic transfer function may be expressed as follows:

$$f_t(s) = \frac{-Ks+1}{(t_1s+1)(t_2s+1)} \quad (1)$$

In equation (1), $f_t$ represents the dynamic transfer function, s represents the Laplacian operator, K represents a coefficient and is associated with the air flowrate provided to the fuel cell system 100 and the fuel cell temperature, and $t_1$ and $t_2$ represent time constants.

The state detector 21 may determine whether the fuel cell system 100 is in the leakage condition based on the coefficient K in the dynamic transfer function. When the coefficient K in the dynamic transfer function of equation (1) is larger than zero, the state detector 21 determines an inverse response indicating cross leakage occurs to the fuel cell system 100. When the inverse response occurs to the fuel cell system 100, the fuel cell temperature will go to an opposite direction initially before it reaches a final steady state. Under this circumstance, if a conventional PI (Proportion Integration) controller is still used, the conventional PI controller will be fooled by such an inverse response and go in a wrong direction which would lead to big overshoot and even oscillation and unstable state of the fuel cell system. This would translate to a big swing of temperature response with overshoot and even thermal runaway. Thus, when determining the inverse response occurs, the state detector 21 of the present disclosure may further determine the fuel cell system 100 is in the leakage condition, and the control selector 22 may switch to the internal model controller 24. The air blower 4 of the fuel cell system 100 is controlled by the internal model controller 24 to regulate the air flowrate provided to the fuel cell system 100 so as to adjust the fuel cell temperature. When the coefficient K in the dynamic transfer function of equation (1) is equal to zero or less than zero, the state detector 21 determines that no inverse response occurs and determines the fuel cell system 100 is in the normal condition. Under this circumstance, the control selector 22 may switch to the normal controller 23, and the air blower 4 of the fuel cell system 100 is controlled by the normal controller 23 to regulate the air flowrate provided to the fuel cell system 100 so as to adjust the fuel cell temperature.

The cross leakage of the fuel cell stack 1 is taken only as an example of the leakage condition above. However, the temperature control system 2 of the present disclosure should not be limited to be applied to the cross leakage condition of the fuel cell stack 1. For example, in another embodiment, if the fuel cell stack 1 is sealed within an enclosure, when overboard leakage occurs to the fuel cell stack 1, the fuel cell stack 1 may also present the inverse response. Under this circumstance, the temperature control system 2 of the present disclosure may be also similarly applied.

The temperature control system 2 may further include a bump-less transfer unit 25. The bump-less transfer unit 25 is used to avoid a large overshoot of the controller and ensure no bump in an air flowrate command $Q_{cmd}$ generated during switching between the normal controller 23 and the internal model controller 24. For example, when the normal controller 23 is running and now it is required to transfer from the normal controller 23 to the internal model controller 24, a fuel cell temperature setpoint $T_{sp}$ of the internal model controller 24 will track (i.e. is set equal to) a process variable (i. e. fuel cell temperature). So when the control is switched from the normal controller 23 to the internal model controller 24, the fuel cell temperature setpoint $T_{sp}$ of the internal model controller 24 and the process variable are equal to each other. Thus, there is no sudden "bump" in the air flowrate command $Q_{cmd}$ output.

Figure 2:
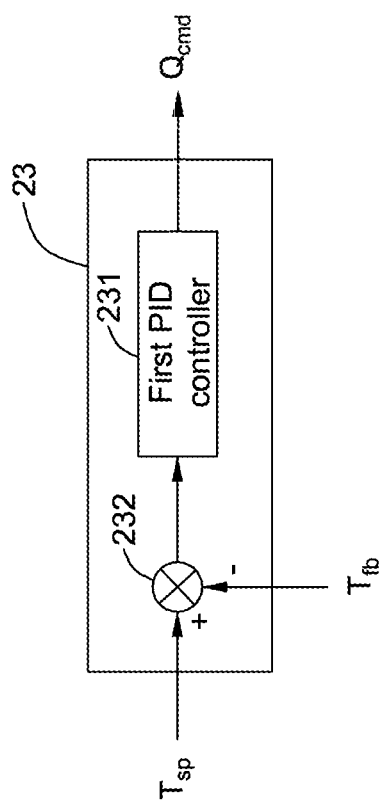
FIG. 2 is a schematic diagram of a normal controller of FIG. 1.

FIG. 2 illustrates a schematic diagram of the normal controller 23. As shown FIG. 2, the normal controller 23 includes a PID (Proportion Integration Differentiation) controller (named as a first PID controller) 231, and a subtractor 232. The fuel cell temperature setpoint $T_{sp}$ and the fuel cell temperature feedback $T_{fb}$ may be input to the subtractor 232. The subtractor 232 may receive the fuel cell temperature setpoint $T_{sp}$ and the fuel cell temperature feedback $T_{fb}$ and generate a temperature error. The temperature error may be sent to the first PID controller 231. The first PID controller 231 may generate the air flowrate command $Q_{cmd}$ based on the temperature error and provide the air flowrate command $Q_{cmd}$ to the air blower 4 of the fuel cell system 100. The air blower 4 may regulate the air flowrate provided to the cathode 12 of the fuel cell stack 1 in response to the air flowrate command $Q_{cmd}$.

Figure 3:
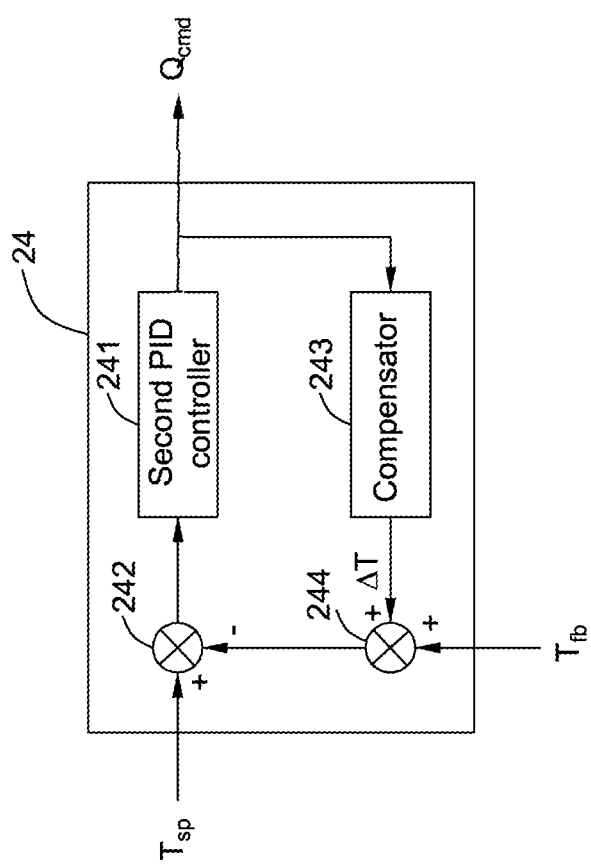
FIG. 3 is a schematic diagram of an internal model controller of FIG. 1 in accordance with one embodiment of the present disclosure.

FIG. 3 illustrates a schematic diagram of the internal model controller 24 in accordance with one embodiment of the present disclosure. As shown FIG. 3, the internal model controller 24 also includes a PID controller (named as a second PID controller) 241 and a subtractor 242. A gain of the second PID controller 241 is adaptable based on the dynamic transfer function. The internal model controller 24 further includes a compensator 243 and a summator 244. The compensator 243 may compensate the inverse response of the fuel cell system 100 to increase stability of the fuel cell system 100.

The compensator 243 may have the following compensation function:

$$f_c(s) = \frac{\lambda s}{(t_1 s + 1)(t_2 s + 1)} \quad (2)$$

In equation (2), $f_C$ represents the compensation function, and $\lambda$ represents a compensation coefficient.

As an example, the compensator 243 may be a Smith predictor compensator 243. Preferably, the compensation coefficient $\lambda=2K$.

Referring to FIG. 3, an output of the second PID controller 241 is fed back to an input of the compensator 243 and an output of the compensator 243 is fed forward to an input of the second PID controller 241. In detail, the compensator 243 may compensate the output of the second PID controller 241 to generate a temperature compensation $\Delta T$. The temperature compensation $\Delta T$ and the fuel cell temperature feedback $T_{fb}$ may be input to the summator 244. The summator 244 may add the temperature compensation $\Delta T$ to the fuel cell temperature feedback $T_{fb}$ to obtain an added fuel cell temperature feedback. The fuel cell temperature setpoint $T_{sp}$ and the added fuel cell temperature feedback may be input to the subtractor 242. The subtractor 242 may receive the fuel cell temperature setpoint $T_{sp}$ and the added fuel cell temperature feedback and generate a temperature error. The temperature error may be sent to the second PID controller 241. The second PID controller 241 may generate the air flowrate command $Q_{cmd}$ based on the temperature error and provide the air flowrate command $Q_{cmd}$ to the air blower 4 of the fuel cell system 100.

Because the internal model controller 24 adds the compensator 243, which changes characteristics of the fuel cell system 100 and improve stability boundary of the controller, the second PID controller 241 is different from the first PID controller 231 of the normal controller 23, and the second PID controller 241 has a larger gain than the first PID controller 231.

Figure 4:
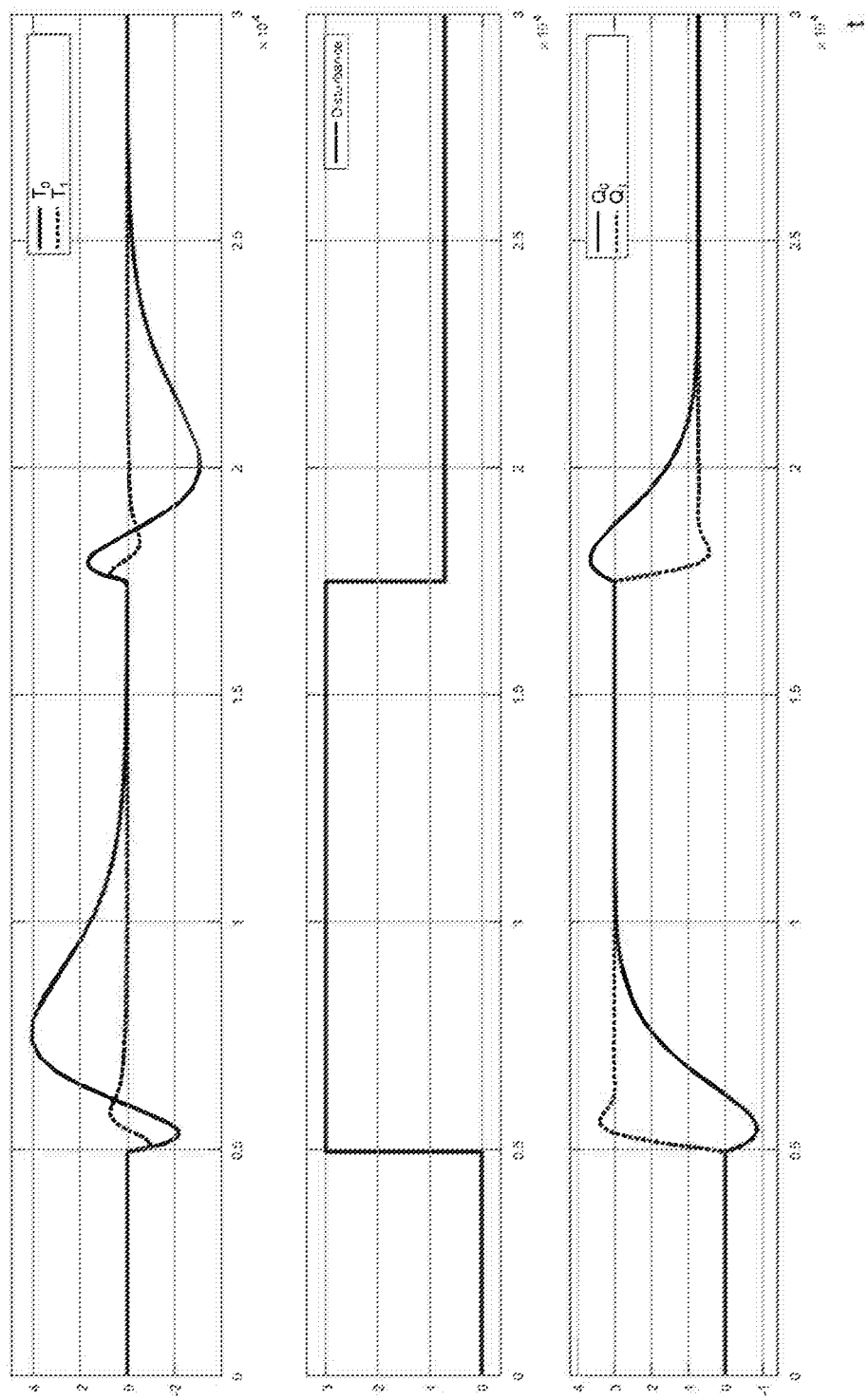
FIG. 4 is an effect view of the control of the internal model controller of FIG. 3 with a compensator.

FIG. 4 illustrates an effect view of the control of the internal model controller 24 with the compensator 243. In FIG. 4, the X axis represents the time axis t and the Y axis represents different curves respectively. The curve $T_0$ represents a curve of process variable (i.e. the fuel cell temperature) of the control by the normal controller 23 without the compensator 243, the curve $T_1$ represents a curve of process variable (i.e. the fuel cell temperature) of the control by the internal model controller 24 with the compensator 243, the curve $Q_0$ represents a curve of output (i.e. the air flowrate) of the control by the normal controller 23 without the compensator 243, and the curve $Q_1$ represents a curve of output (i.e. the air flowrate) of the control by the internal model controller 24 with the compensator 243. It can be clearly seen from FIG. 4 that after the compensator 243 is added, control effect of the fuel cell temperature is much better than that of a pure PID controller. Thus, when the fuel cell system 100 has a disturbance, for example, the current command change of the fuel cell stack 1, such the compensator structure will allow the fuel cell stack 1 to have quicker power response due to better temperature control and allow the internal model controller 24 to have much stronger disturbance rejection capability due to a higher bandwidth, and the fuel cell system 100 controlled by the internal model controller 24 with the compensator 243 can have smaller overshoot and faster response time.

Figure 5:
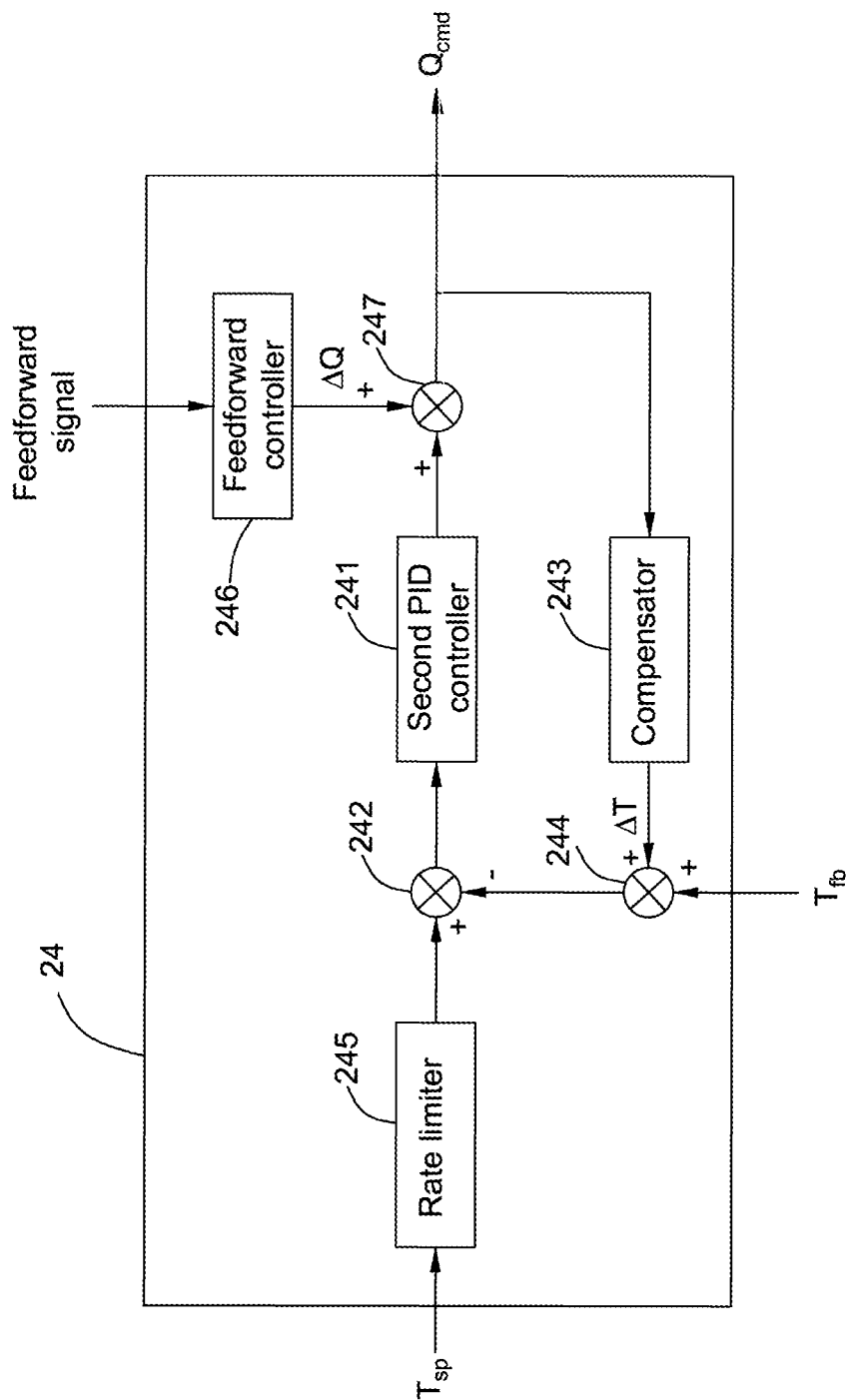
FIG. 5 is a schematic diagram of an internal model controller of FIG. 1 in accordance with another embodiment of the present disclosure.

As shown FIG. 5, the internal model controller 24 may further include a rate limiter 245 for the fuel cell temperature setpoint $T_{sp}$. The rate limiter 245 may limit the rate of change in the fuel cell temperature setpoint value used in control. When a change of the fuel cell temperature setpoint value exceeds a rate of change limit, then a rate limited value is used in control. Thus, the full change of the fuel cell temperature setpoint value is not immediately seen in control until the rate limited value catches up to a target value of the fuel cell temperature setpoint $T_{sp}$.

With continued reference to FIG. 5, the internal model controller 24 may further include a feedforward controller 246 and a summator 247. The feedforward controller 246 may receive a feedforward signal from at least one of a power output, a fuel flowrate and a recycle ratio of the fuel cell system 100, and generate an air flowrate compensation $\Delta Q$ based on the feedforward signal. The output of the second PID controller 241 and the air flowrate compensation $\Delta Q$ may be input to the summator 247. The summator 247 may add the air flowrate compensation $\Delta Q$ to the output of the second PID controller 241 so as to generate the air flowrate command $Q_{cmd}$.

Figure 6:
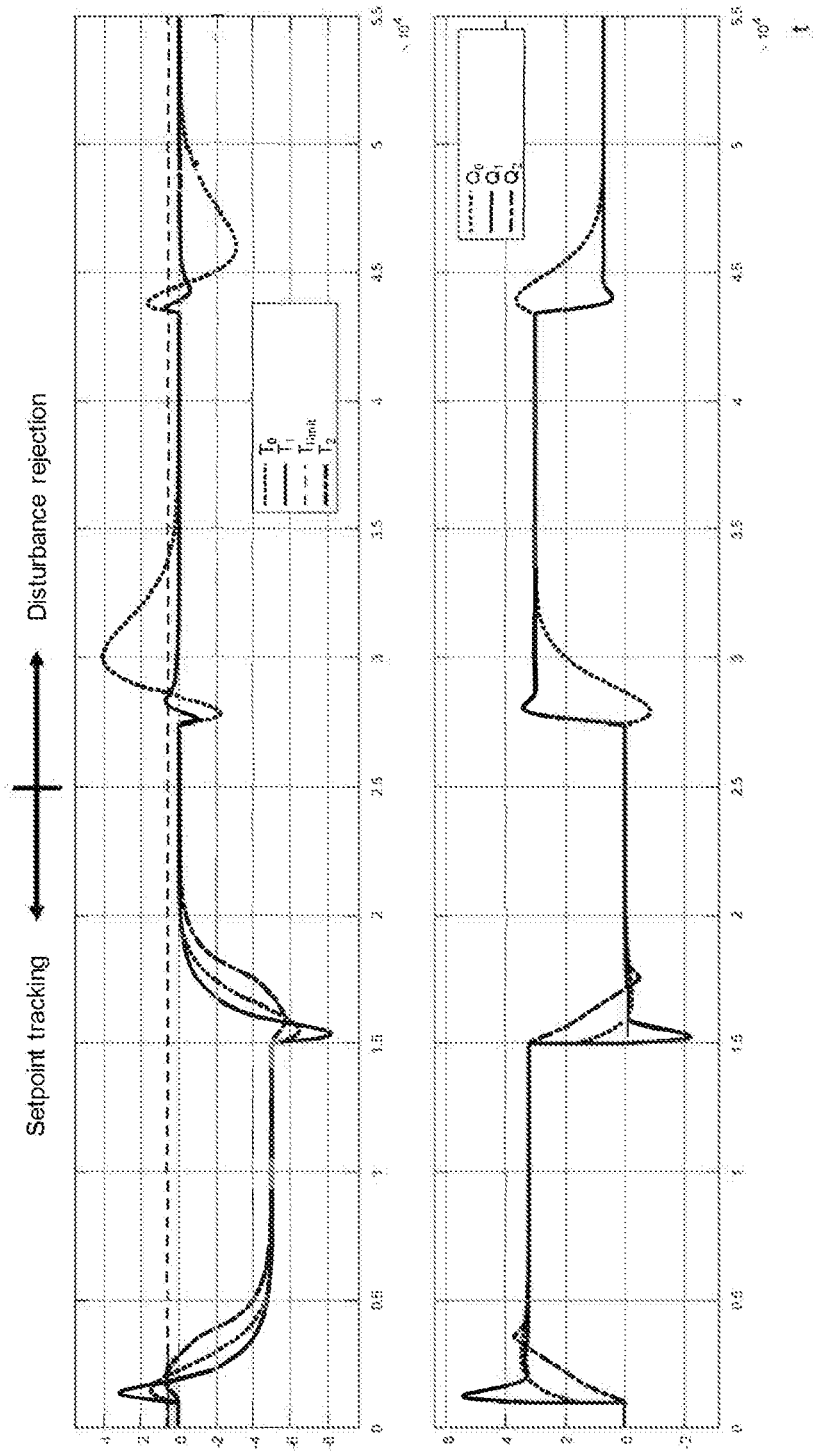
FIG. 6 is an effect view of the control of the internal model controller of FIG. 5 with a rate limiter and the compensator.

FIG. 6 illustrates an effect view of the control of the internal model controller 24 with the rate limiter 245 and the compensator 243. In FIG. 6, the X axis represents the time axis t and the Y axis represents different curves respectively. The line $T_{limit}$ represents a high limit of the fuel cell temperature, the curve $T_0$ represents a curve of process variable (i.e. the fuel cell temperature) of the control by the normal controller 23 without the compensator 243, the curve $T_1$ represents a curve of process variable (i.e. the fuel cell temperature) of the control by the internal model controller 24 with the compensator 243, the curve $T_2$ represents a curve of process variable (i.e. the fuel cell temperature) of the control by the internal model controller 24 with the rate limiter 245 and the compensator 243, the curve $Q_0$ represents a curve of output (i.e. the air flowrate) of the control by the normal controller 23 without the compensator 243, the curve $Q_1$ represents a curve of output (i.e. the air flowrate) of the control by the internal model controller 24 with the compensator 243, and the curve $Q_2$ represents a curve of output (i.e. the air flowrate) of the control by the internal model controller 24 with the rate limiter 245 and the compensator 243. It can be clearly seen from the curve $T_2$ of FIG. 6 that a combined solution of the compensator 243 and the rate limiter 245 can ensure a better fuel cell temperature control effect. Before the time axis t=2.5 of FIG. 6 is to check fuel cell temperature setpoint tracking effect and after the time axis t=2.5 is to verify anti-interference capability of the controller. Thus, it can be seen from before the time axis 2.5 of FIG. 6 that the internal model controller 24 with the rate limiter 245 and the compensator 243 can have better fuel cell temperature setpoint tracking effect and it can be seen from after the time axis 2.5 of FIG. 6 that the internal model controller 24 with the rate limiter 245 and the compensator 243 can have much stronger disturbance rejection capability and better anti-interference capability.

The fuel cell system 100 of the present disclosure using the temperature control system 2 to detect cross leakage of the fuel cell stack 1 has lower cost without adding additional sensors. The internal model controller 24 in the temperature control system 2 can increase the stability margin and improve system safety. The dual temperature control system of the present disclosure using the normal controller 23 and the internal model controller 24 can improve reliability and durability of the fuel cell system 100, and the temperature control system 2 of the present disclosure can improve operating efficiency by maintaining the fuel cell temperature automatically and save working hours of operating personnel. Furthermore, the temperature control system 2 of the present disclosure has easy structure, and is easy to implement.

Temperature Control Method for Fuel Cell System

Figure 7:
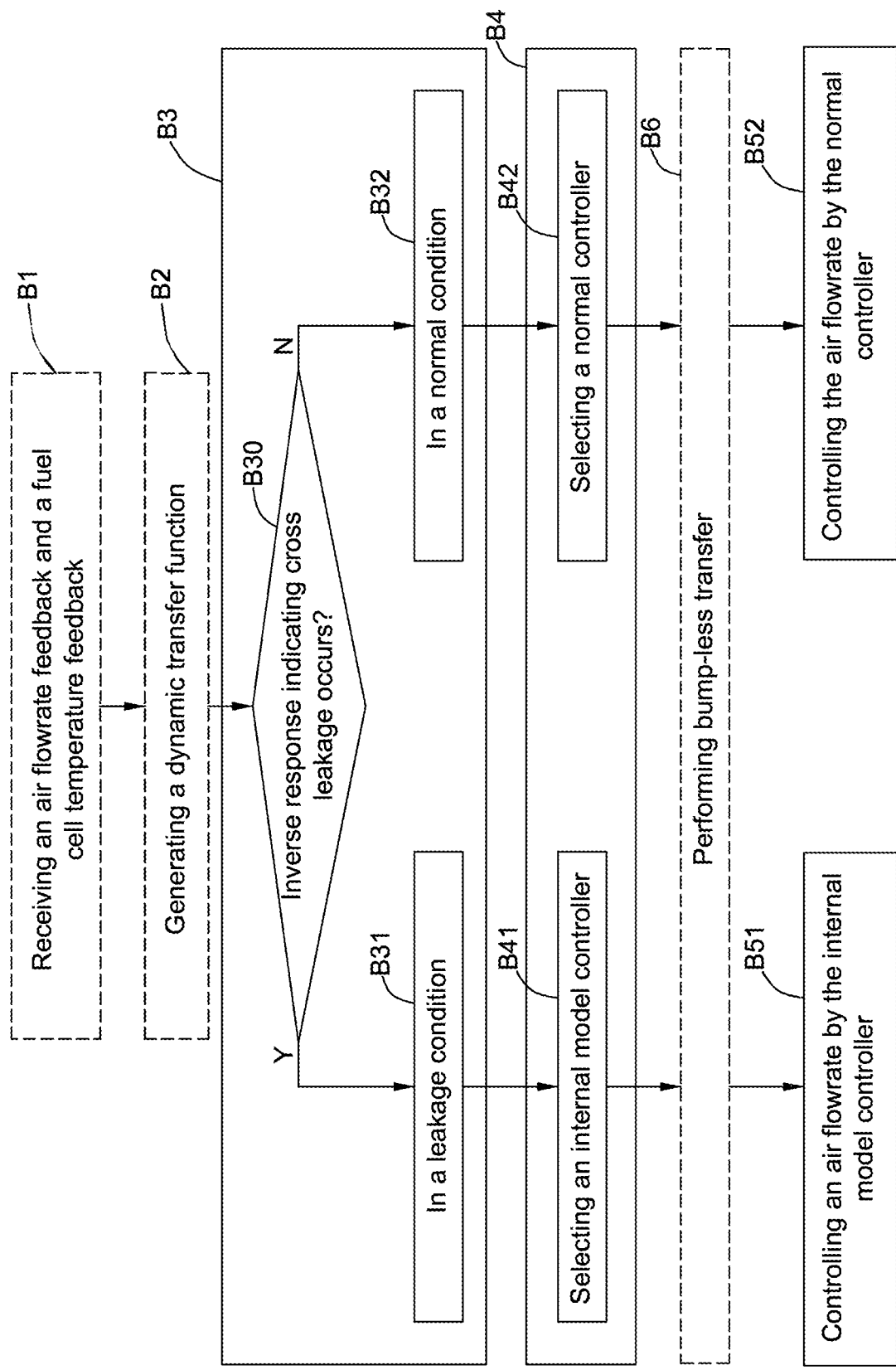
FIG. 7 is a flow chart of a temperature control method for a fuel cell system in accordance with one embodiment of the present disclosure.

FIG. 7 illustrates a flow chart of a temperature control method for a fuel cell system 100 in accordance with one embodiment of the present disclosure. The temperature control method may include the steps as follows.

As shown in block B1 of FIG. 7, an air flowrate feedback $Q_{fb}$ and a fuel cell temperature feedback $T_{fb}$ of the fuel cell system 100 are received.

In block B2, a dynamic transfer function from an air flowrate provided to the fuel cell system 100 to a fuel cell temperature of the fuel cell system 100 as shown in equation (1) above is generated based on the air flowrate feedback $Q_{fb}$ and the fuel cell temperature feedback $T_{fb}$.

In block B3, whether the fuel cell system 100 is in a leakage condition is determined based on the dynamic transfer function. Block B3 may include the following steps B30, B31 and B32.

In block B30, it is determined whether an inverse response indicating cross leakage occurs to the fuel cell system 100 based on the dynamic transfer function of equation (1). When the coefficient K in the dynamic transfer function of equation (1) is larger than zero, the inverse response is determined to occur and the process goes to block B31 in which it is determined that the fuel cell system 100 is in the leakage condition. When the coefficient K is equal to zero or less than zero, no inverse response is determined to occur and the process goes to block B32 in which it is determined that the fuel cell system 100 is not in the leakage condition, i.e. in a normal condition.

In block B4, it is selected to switch between a normal controller 23 and an internal model controller 24 based on a determined result. Block B4 may include the following steps B41 and B42. When the fuel cell system 100 is in the leakage condition, the process goes to block B41 from block B31. In block B41, the internal model controller 24 is selected and the process goes to block B51. In block 51, an air flowrate provided to the fuel cell system 100 is controlled by the internal model controller 24 to control the fuel cell temperature. When the fuel cell system 100 is in the normal condition, the process goes to block B42 from block B32. In block B42, the normal controller 23 is selected and the process goes to block B52. In block 52, the air flowrate provided to the fuel cell system 100 is controlled by the normal controller 23 to control the fuel cell temperature.

In an optional embodiment, the temperature control method of the present disclosure may further include block B6 after block B41 and before block B51, or after block B42 and before block B52. In block B6, bump-less transfer between the normal controller 23 and the internal model controller 24 is performed to ensure no bump in an air flowrate command $Q_{cmd}$ output.

The internal model controller 24 includes a second PID controller 241 and a compensator 243. Hereinafter, the step B51 of how to control the air flowrate of the fuel cell system 100 by the internal model controller 24 in FIG. 7 will be described in detail with reference to FIG. 8.

Figure 8:
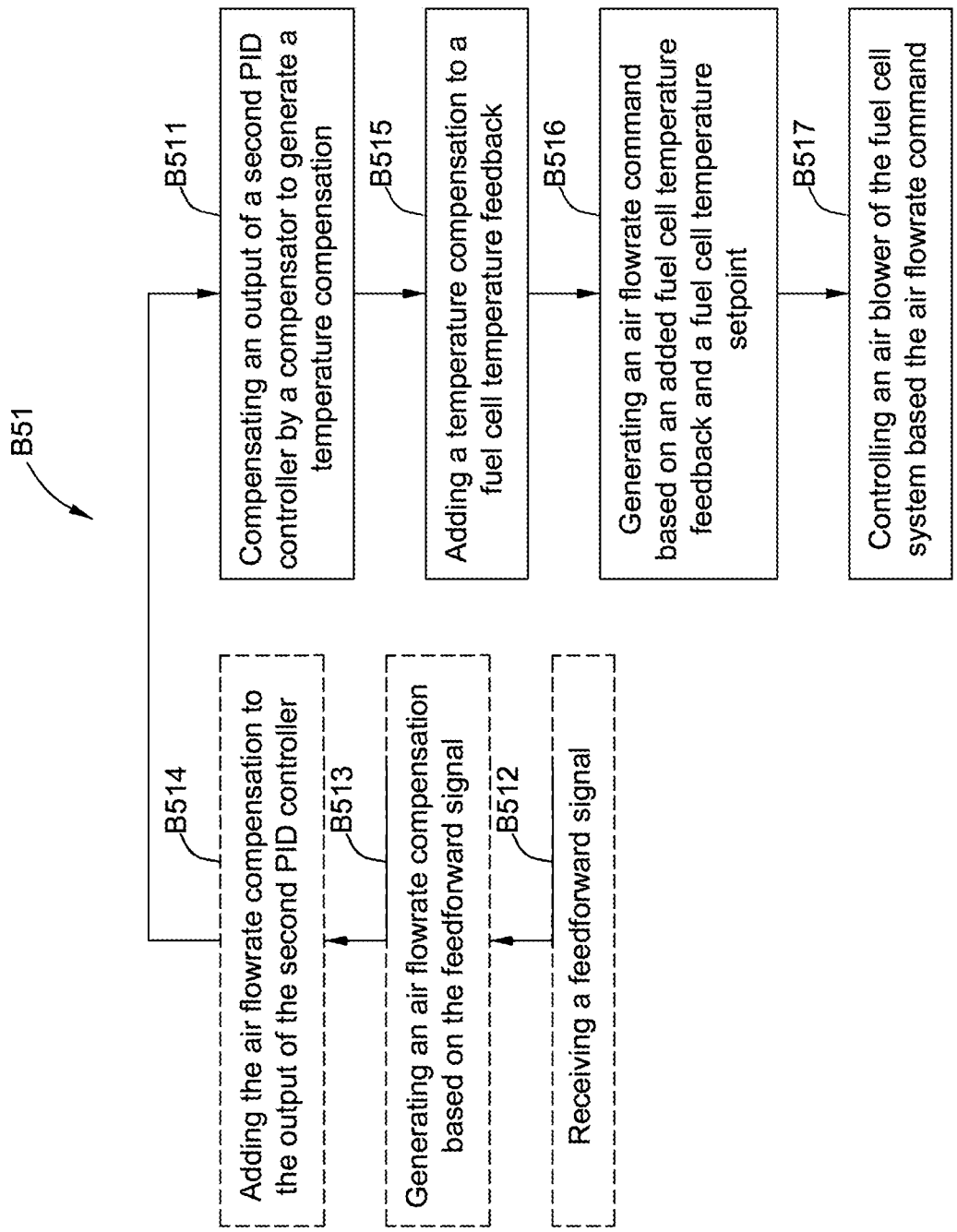
FIG. 8 is a flow chart of how to control an air flowrate of the fuel cell system by the internal model controller in FIG. 7.

As shown in block B511 of FIG. 8, an output of the second PID controller 241 is compensated by the compensator 243 to generate a temperature compensation $\Delta T$ and the process goes to block B515. The compensator 243 has a compensation function as shown in equation (2) above. The output of the second PID controller 241 is multiplied by the compensation function of the compensator 243 to generate the temperature compensation $\Delta T$.

Optionally, the temperature control method of the present disclosure may further include feedforward control. Thus, the temperature control method of the present disclosure may further include the following steps B512-B514.

In block B512, a feedforward signal is received from at least one of a power output, a fuel flowrate and a recycle ratio of the fuel cell system 100.

In block B513, an air flowrate compensation ΔQ is generated based on the feedforward signal.

In block B514, the air flowrate compensation ΔQ is added to the output of the second PID controller 241 of the internal model controller 24 and then the process goes to block B511. Under this circumstance, in block B511, compensation is performed to an added output of the second PID controller 241.

In block B515, the temperature compensation ΔT is added to a fuel cell temperature feedback $T_{fb}$ of the fuel cell system 100.

In block B516, an air flowrate command $Q_{cmd}$ of the fuel cell system 100 is generated based on an added fuel cell temperature feedback and a fuel cell temperature setpoint $T_{sp}$. Optionally, the temperature control method of the present disclosure may further include performing a rate limiting for the fuel cell temperature setpoint $T_{sp}$. Thus, under this circumstance, the air flowrate command $Q_{cmd}$ is generated based on the added fuel cell temperature feedback and a rate-limited fuel cell temperature setpoint.

In block B517, an air blower 4 of the fuel cell system 100 is controlled based on the air flowrate command $Q_{cmd}$.

The temperature control method of the present disclosure using the normal controller 23 and the internal model controller 24 can improve reliability and durability of the fuel cell system 100, and the temperature control method of the present disclosure can improve operating efficiency by maintaining the fuel cell temperature automatically and save working hours of operating personnel.

While steps of the temperature control method in accordance with embodiments of the present disclosure are illustrated as functional blocks, the order of the blocks and the separation of the steps among the various blocks shown in FIGS. 7 and 8 are not intended to be limiting. For example, the blocks may be performed in a different order and a step associated with one block may be combined with one or more other blocks or may be sub-divided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A temperature control system for a fuel cell system comprising:
    a state detector for determining whether the fuel cell system is in a leakage condition based on a dynamic transfer function from an air flowrate provided to the fuel cell system to a fuel cell temperature of the fuel cell system;
    a control selector for selecting to switch between a normal controller and an internal model controller based on a determined result;
    the normal controller for controlling an air flowrate of the fuel cell system which is not in the leakage condition to control the fuel cell temperature; and
    the internal model controller for controlling the air flowrate of the fuel cell system in the leakage condition to control the fuel cell temperature.

2. The temperature control system of claim 1, wherein the dynamic transfer function is expressed as follows:

$$f_t(s) = \frac{-Ks + 1}{(t_1 s + 1)(t_2 s + 1)}$$

wherein $f_t$ represents the dynamic transfer function, s represents the Laplacian operator, K represents a coefficient and is associated with the air flowrate and the fuel cell temperature, and $t_1$ and $t_2$ represent time constants.

3. The temperature control system of claim 2, wherein when the coefficient K is larger than zero, the state detector determines an inverse response indicating cross leakage occurs to the fuel cell system and determines the fuel cell system is in the leakage condition, and when the coefficient K is equal to zero or less than zero, the state detector determines no inverse response occurs and determines the fuel cell system is in a normal condition.

4. The temperature control system of claim 3, wherein the internal model controller comprises a compensator for compensating the inverse response of the fuel cell system to increase stability of the fuel cell system.

5. The temperature control system of claim 4, wherein the compensator has the following compensation function:

$$f_c(s) = \frac{\lambda s}{(t_1 s + 1)(t_2 s + 1)}$$

wherein $f_c$ represents the compensation function, and λ represents a compensation coefficient.

6. The temperature control system of claim 5, wherein the compensator is a Smith predictor compensator and the compensation coefficient λ=2K.

7. The temperature control system of claim 4, wherein the internal model controller comprises a PID controller and a gain of the PID controller is adaptable based on the dynamic transfer function, an output of the PID controller being fed back to an input of the compensator and an output of the compensator being fed forward to an input of the PID controller.

8. The temperature control system of claim 7, wherein the normal controller comprises a PID controller, the PID controller of the normal controller having a smaller gain than the PID controller of the internal model controller.

9. The temperature control system of claim 7, wherein the internal model controller further comprises a feedforward controller for receiving a feedforward signal from at least one of a power output, a fuel flowrate and a recycle ratio of the fuel cell system, and generating an air flowrate compensation based on the feedforward signal, the air flowrate compensation being added to the output of the PID controller.

10. The temperature control system of claim 1, wherein the internal model controller further comprises a rate limiter for a fuel cell temperature setpoint.

11. The temperature control system of claim 1, further comprising:
    a bump-less transfer unit for ensuring no bump in an air flowrate command generated during switching between the normal controller and the internal model controller.

12. The temperature control system of claim 1, wherein the fuel cell temperature comprises a temperature at an anode outlet of a fuel cell stack in the fuel cell system, a temperature of a fuel cell surface in the fuel cell system, a temperature of a bottom or top plate of the fuel cell stack, and a temperature in an anode gas passage of the fuel cell stack.

13. A temperature control method for a fuel cell system, comprising:
   determining whether the fuel cell system is in a leakage condition based on a dynamic transfer function from an air flowrate provided to the fuel cell system to a fuel cell temperature of the fuel cell system;
   selecting to switch between a normal controller and an internal model controller based on a determined result;
   controlling, by the internal model controller, an air flowrate of the fuel cell system to control the fuel cell temperature when the fuel cell system is in the leakage condition; and
   controlling, by the normal controller, the air flowrate of the fuel cell system to control the fuel cell temperature when the fuel cell system is not in the leakage condition.

14. The temperature control method of claim 13, further comprising:
   receiving an air flowrate feedback and a fuel cell temperature feedback of the fuel cell system; and
   generating the dynamic transfer function based on the air flowrate feedback and the fuel cell temperature feedback, wherein the dynamic transfer function is expressed as follows:

$$f_t(s) = \frac{-Ks + 1}{(t_1 s + 1)(t_2 s + 1)}$$

wherein $f_t$ represents the dynamic transfer function, s represents the Laplacian operator, K represents a coefficient and is associated with the air flowrate and the fuel cell temperature, and $t_1$ and $t_2$ represent time constants.

15. The temperature control method of claim 14, wherein determining whether the fuel cell system is in the leakage condition based on the dynamic transfer function comprises:
   determining an inverse response indicating cross leakage occurs to the fuel cell system when the coefficient K is larger than zero and determining the fuel cell system is in the leakage condition; and
   determining no inverse response occurs when the coefficient K is equal to zero or less than zero and determines the fuel cell system is in a normal condition.

16. The temperature control method of claim 13, wherein the internal model controller comprises a PID controller and a compensator, controlling the air flowrate by the internal model controller comprising:
   compensating, by the compensator, an output of the PID controller to generate a temperature compensation;
   adding the temperature compensation to a fuel cell temperature feedback of the fuel cell system;
   generating an air flowrate command of the fuel cell system based on an added fuel cell temperature feedback and a fuel cell temperature setpoint; and
   controlling an air blower of the fuel cell system based on the air flowrate command.

17. The temperature control method of claim 16, further comprising:
   receiving a feedforward signal from at least one of a power output, a fuel flowrate and a recycle ratio of the fuel cell system;
   generating an air flowrate compensation based on the feedforward signal; and
   adding the air flowrate compensation to the output of the PID controller.

18. The temperature control method of claim 16, further comprising:
   performing a rate limiting for the fuel cell temperature setpoint, wherein the air flowrate command is generated based on the added fuel cell temperature feedback and a rate-limited fuel cell temperature setpoint.

19. The temperature control method of claim 16, wherein compensating the output of the PID controller comprises:
   multiplying the output of the PID controller by a compensation function of the compensator to generate the temperature compensation, wherein the compensation function is expressed as follows:

$$f_c(s) = \frac{\lambda s}{(t_1 s + 1)(t_2 s + 1)}$$

wherein $f_c$ represents the compensation function, and $\lambda$ represents a compensation coefficient.

20. The temperature control method of claim 13, further comprising:
   performing bump-less transfer between the normal controller and the internal model controller.

21. A fuel cell system comprising:
   a fuel cell stack for generating power and having an anode and a cathode;
   a fuel regulator for regulating a fuel flowrate of a fuel provided to the anode;
   an air blower for regulating an air flowrate of air provided to the cathode;
   an air flowmeter for measuring the air flowrate;
   a temperature sensor for measuring a fuel cell temperature; and
   the temperature control system as claimed in claim 1.

22. The fuel cell system of claim 21, further comprising:
   a fuel reformer for receiving the fuel and a tail gas from an anode outlet of the anode and generating a reformate, wherein at least one portion of the reformate is returned to an anode inlet of the anode.

* * * * *